United States Patent [19]

Tabata et al.

[11] Patent Number: 5,001,562

[45] Date of Patent: Mar. 19, 1991

[54] SCANNING LINE CONVERTING SYSTEM FOR DISPLAYING A HIGH DEFINITION TELEVISION SYSTEM VIDEO SIGNAL ON A TV RECEIVER

[75] Inventors: Toshio Tabata; Akihiro Ono, both of Tokyo, Japan

[73] Assignee: Pioneer Electronic Corporation, Tokyo, Japan

[21] Appl. No.: 463,735

[22] Filed: Jan. 11, 1990

[30] Foreign Application Priority Data

Jul. 21, 1989 [JP] Japan .................................. 64-187538
Jul. 26, 1989 [JP] Japan .................................. 64-191262

[51] Int. Cl.[5] .............................................. H04N 7/01
[52] U.S. Cl. ........................................ 358/140; 358/11
[58] Field of Search .................. 358/140, 11, 133, 138

[56] References Cited

U.S. PATENT DOCUMENTS 4,603,350  7/1986  Arbeiter et al. .................. 358/11 X
4,633,293  12/1986  Powers ............................ 358/140 X Primary Examiner—Victor R. Kostak
Attorney, Agent, or Firm—Sughrue, Mion, Zinn, Macpeak & Seas

[57] ABSTRACT

A scanning line converting system comprises down-converters arranged in parallel for converting an input high definition television signal to a current television signal, and double-frequency converting sections for respectively doubling the frequency of the down-converted current television signals, for synthesizing them, and for delivering the synthesized signal as a non-interlaced video signal. The non-interlaced video signal can be obtained by properly controlling a vertical filter which is a part of the down-converter with no additional interlace/non-interlace converting unit.

9 Claims, 5 Drawing Sheets

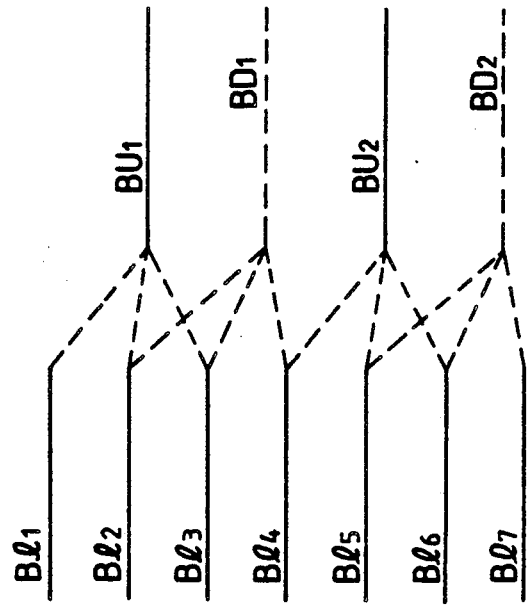
FIG. 4(a) CONVERSION OF FIRST FIELD
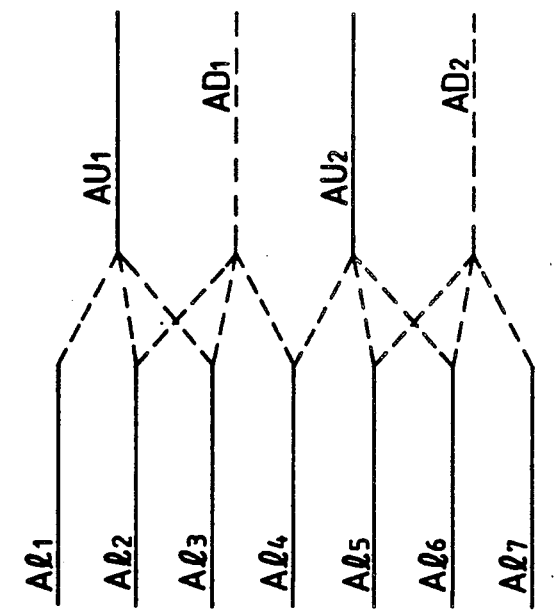
FIG. 4(b) CONVERSION OF SECOND FIELD

CONVERSION OF FIRST FIELD

CONVERSION OF SECOND FIELD

FULL-SCREEN MODE

LEFT-AND-RIGHT-SIDE CUT MODE

SCANNING LINE CONVERTING SYSTEM FOR DISPLAYING A HIGH DEFINITION TELEVISION SYSTEM VIDEO SIGNAL ON A TV RECEIVER

BACKGROUND OF THE INVENTION

1. Field of the Invention

This invention relates to a scanning line converting system for displaying a high definition television system video signal on a television receiver by reducing the number of scanning lines. More particularly, it is directed to a scanning line converting system for displaying, via non-interlaced scanning, the high definition television signal transmitted via interlaced scanning.

2. Description of the Related Art

A high definition television system, such as a "high vision" system, has been proposed as a new television system for replacing the current television system. Such a high definition television system is capable of not only improving the quality of the picture and sound, but is also capable of providing powerful visuo-psychic effects with far more realistic and sharper pictures than the current system. A MUSE (Multiple Sub-Nyquite Sampling Encoding) system is a transmission system proposed for the high definition television signals.

Since the MUSE system differs greatly in the screen, scanning, and audio processing from the current television system, such as an NTSC (National Television System Committee) system, it is not possible to reproduce the MUSE signal directly on NTSC-based television receivers. For this reason, a MUSE/NTSC converter (down-converter) has been proposed to convert a MUSE signal to an NTSC signal for display on the receiver by cancelling out the differences, such as the number of scanning lines, aspect ratio, field frequencies, and the like, existing between the two systems.

FIG. 6 shows diagrams of examples of images in the output of a down-converter. FIG. 6(a) shows an output mode, whereby 1032 effective scanning lines of a MUSE signal are reduced by about a third so as to be allocated to 344 NTSC-based effective scanning lines without changing the aspect ratio of 16:9 of the MUSE system (hereinafter referred to as "full-screen mode"). In this mode, about 30% of the effective scanning lines are blanked out on both the top and bottom of the screen, with the horizontal screen being the same as in the original MUSE-based screen.

FIG. 6(b) shows another output mode, whereby 1032 effective scanning lines of the MUSE signal are reduced by about a half so as to be allocated to 483 NTSC-based effective scanning lines without changing the aspect ratio of 4:3 of the NTSC system, thereby deleting about 30% of picture elements from both left and right sides of the image (hereinafter referred to as "left-and-right-side cut mode"). In this mode, a portion to be deleted can be determined arbitrarily.

By way of background information, in the current television system represented by the NTSC system, a number of methods have been developed to reduce the bandwidth. One of such methods is interlaced scanning. This scanning is a system in which one complete screen (one frame) is formed by two roughly scanned screens utilizing the afterimage effect of the eye or television receiver. The odd-numbered scanning lines are transmitted in the first field and the even-numbered scanning lines in the second field to form and thereby display one frame of a picture. In comparison with the non-interlaced scanning in which all the scanning lines of a video signal are transmitted, that is, where the video signal is displayed with one scanning, interlaced scanning provides the advantage in that the frequency bandwidth of a video signal can be reduced by half without impairing the picture quality.

However, interlaced scanning has the problems of interline flicker and reduced vertical resolution because a delay of 1/30 seconds occurs between two odd-numbered fields which causes the image of the even-numbered field displayed in between to interfere with the picture. Especially in recent years, the introduction of high-luminance cathode-ray tubes (CRT) has aggravated the problem of interline flicker which has been negligible in low-luminance CRTs. The flicker effect becomes more objectionable with increased luminance and screen size.

Thus, to improve the picture quality, it is conceivable to improve the vertical resolution by converting an interlaced scanning signal to a non-interlaced scanning signal. Particularly, it is preferable to employ non-interlaced scanning when displaying the high-vision MUSE signal converted to the NTSC signal. However, interpolation of scanning lines of the once-NTSC converted signal for display via non-interlaced scanning appreciably impairs the high-quality picture. Further, the receiver, which is to display the NTSC-converted signal, functions merely in the ordinary NTSC-based non-interlaced display mode, and is thereby lacking in such functions as adaptation processing and interpolation processing required for MUSE/NTSC conversion and display. This results in complicating the design and increasing the cost.

SUMMARY OF THE INVENTION

An object of this invention is to provide a scanning line converting system capable of performing a non-interlaced display with simple means when a high definition television signal is to be displayed by reducing the number of its scanning lines.

A scanning line converting system according to this invention comprises two down-converters, arranged in parallel, for converting an input high definition television signal to current television signals, and two double-frequency converting means for doubling the frequencies of the two, down-converted current television signals, for synthesizing them, and for delivering a synthesized signal as a non-interlaced output video signal. Each down-converter has a vertical filter for generating one scanning line from a plurality of adjacent scanning lines of the high definition television signal. The vertical filter includes first and second line memories for sequentially delaying a scanning line signal, switching means for selecting one signal from either an input scanning line signal of the first line memory, or an output scanning line signal of the second line memory, and arithmetic operation means for generating one scanning line signal out of a weighted sum of both the output scanning line signals of the respective line memories and the scanning line signal selected by the selecting means. The switching means is selectively switched according to the line to which the vertical filter in operation belongs, and the field and output image mode to which the scanning line signal to be converted belongs.

In the above configuration, an input high definition television signal, such as a MUSE signal, is converted to a digital signal. Then, the digital signal is received by the respective two down-converters, arranged in parallel and of identical construction, so that each received signal will be converted to a current television signal, such as an NTSC signal, with the number of its scanning lines being reduced.

The respective two, down-converted current television signals are further converted to a video signal whose horizontal scanning frequency is double the original MUSE-based frequency at the respective two double-frequency converting sections. The frequency converted scanning line signal of the first line and that of the second line are alternately delivered and synthesized every generation of horizontal synchronization signal to be delivered as a non-interlaced output video signal.

The operation of reducing the number of scanning lines at the down-converter is performed by the vertical filter which is a part of the down-converter. When the vertical filter receives a television signal to be converted, this signal is sequentially delayed by the first and second line memories and converted to one scanning line out of a weighted sum of a plurality of adjacent scanning lines obtained by the arithmetic operation means.

The calculation at the arithmetic operation means is performed by the output signals of both the first and second line memories and the output signal of the switching means for selecting one signal from either the input signal of the first line memory, or the output signal of the second line memory. The switching operation of the switching means is performed, where appropriate, according to the line to which the vertical filter in operation belongs, and the field and output image mode to which the scanning line signal to be converted belongs.

Thus, according to this invention, a non-interlaced video signal can be obtained by properly controlling the vertical filter of the down-converter with no additional interlace/non-interlace converting means.

BRIEF DESCRIPTION OF THE DRAWINGS

FIGS. 4a, 4b, 5a and 5b are diagrams for explaining the operation of the vertical filter.

DETAILED DESCRIPTION OF THE PREFERRED EMBODIMENT

Figure 1:
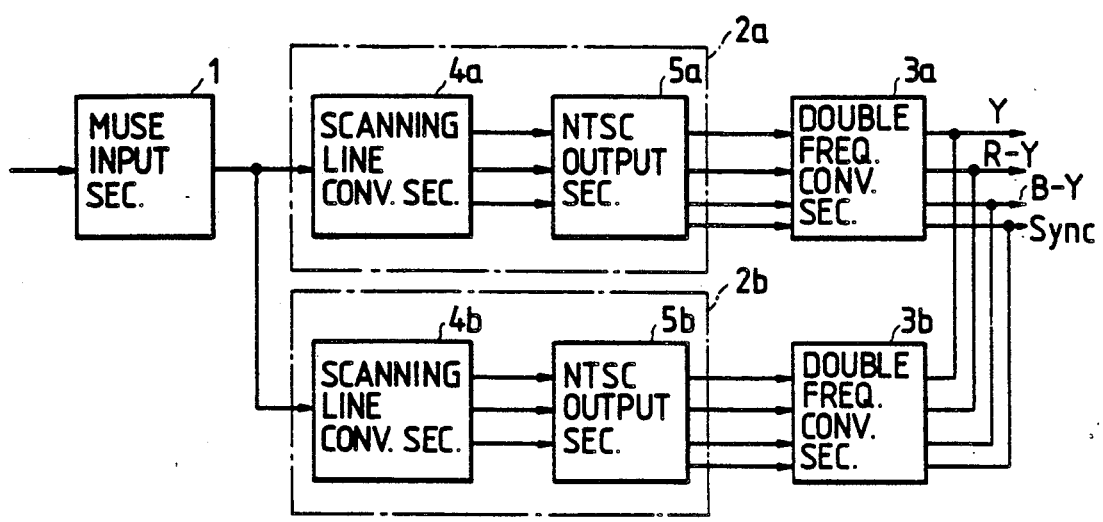
FIG. 1 is a block diagram showing an embodiment of a scanning line converting system according to the invention.

FIG. 1 is a block diagram showing an embodiment of a scanning line converting system according to this invention. In this embodiment, a conversion from a MUSE signal, which is one type of high definition television signal, to an NTSC signal will be described.

In FIG. 1, in a MUSE input section 1, a MUSE baseband signal obtained through a BS tuner is converted to a digital signal, and the output of the MUSE input section is received by two down-converters 2a and 2b. The output signal of the MUSE input section may be separated into a brightness (Y) signal and color (C) signals by a brightness/color (Y/C) separating means (not shown).

The down-converters 2a, 2b are of the same construction comprising, respectively, a scanning line converting section 4a (4b) for reducing the number of scanning lines of the received MUSE signal and for converting the line-reduced MUSE signal to an NTSC signal, and an NTSC output section 5a (5b) for adding horizontal and vertical synchronization signals to the NTSC signal that has been converted from the MUSE signal.

The outputs of the down-converters 2a, 2b are received by double-frequency converting sections 3a, 3b, where the horizontal scanning frequency of 15.75 KHz is doubled to 31.5 KHz. The frequency-converted output signals of the two lines are then synthesized per scanning line and the synthesized scanning line signal is delivered as the non-interlaced output video signal.

Figure 2:
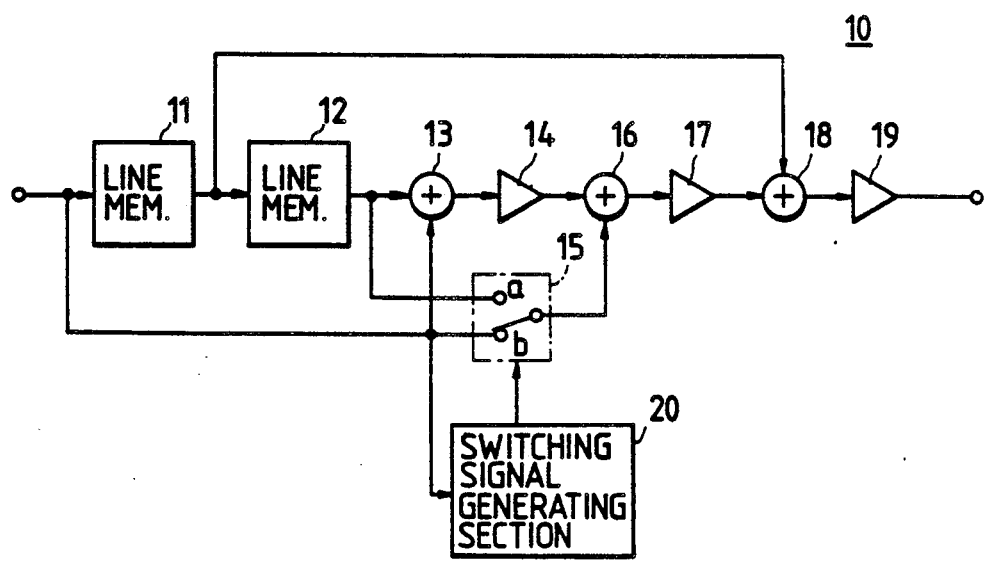
FIG. 2 is a block diagram showing a vertical filter which is a part of the scanning line converting section shown in FIG. 1.

FIG. 2 is a block diagram showing a vertical filter 10 which is a part of the scanning line converting section 4a (4b). The vertical filter 10 comprises first and a second line memories 11, 12 for storing the horizontal scanning line signal for one scanning line of the MUSE signal, an adding circuit 13 for adding a digital input and an output of the line memory 12, a multiplying circuit 14 for multiplying an output of the adding circuit 13 by ½, an adding circuit 16 for adding an output of the multiplying circuit 14 and either the digital input or the output of the line memory 12 selected by a switching circuit 15, a multiplying circuit 17 for multiplying an output of the multiplying circuit 16 by ½, an adding circuit 18 for adding an output of the line memory 11 and an output of the multiplying circuit 17, a multiplying circuit 19 for multiplying an output of the multiplying circuit 18 by ½, and a switching signal generating section 20 for generating a switching signal to control a movable contact of the switching circuit 15. The vertical filters 10 are provided for a brightness (Y) signal and color (C) signals, respectively.

Figure 3A:
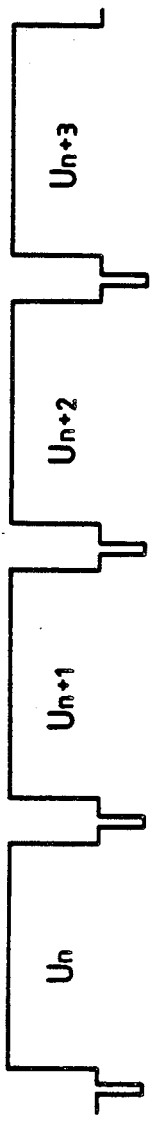
FIGS. 3a–3c are diagrams for explaining the operation of a double-frequency converting section.

In the above configuration, an input of a MUSE baseband signal to the MUSE input section 1 causes the MUSE baseband signal to be converted to a digital signal, and this digital signal is received by the respective down-converters 2a, 2b. The MUSE digital signal received by the down-converter 2a has the number of its scanning lines reduced, and is thus converted to an to an NTSC signal at the scanning line converting section 4a and further gets horizontal and vertical synchronization signals added at the NTSC output section 5a and is delivered to the double-frequency converting section 3a (FIG. 3(a)).

Figure 3B:
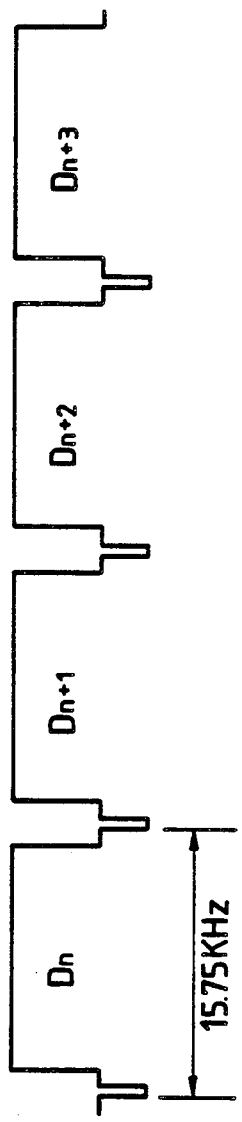

The MUSE signal received by the down-converter 2b similarly has the number of its scanning lines reduced and is thus converted to an NTSC signal at the scanning line converting section 4b, and further gets horizontal and vertical synchronization signals added at the NTSC output section 5b and is delivered to the double-frequency converting section 3b (FIG. 3(b)).

Figure 3C:
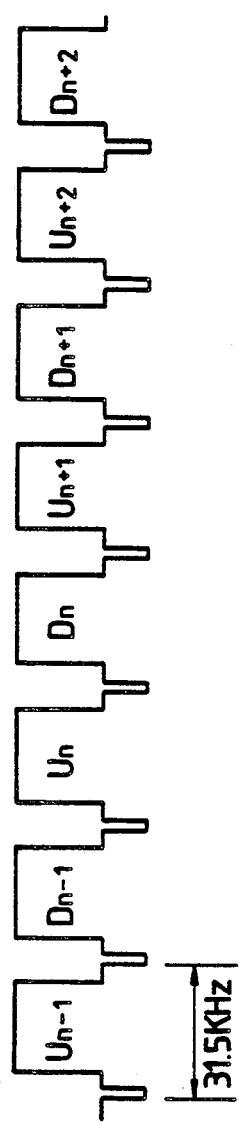

In each of the double-frequency converting sections 3a, 3b, the received NTSC signal is stored in a 1H memory per scanning line. The stored signal is read at a frequency double the original MUSE-based frequency; i.e., the NTSC horizontal scanning frequency of 15.75 KHz is converted to an output video signal having a horizontal scanning frequency of 31.5 KHz. In this case, output scanning line signals $U_n$, $U_{n+1}$, ... of the double-frequency converting section 3a and output scanning line signals $D_n$, $D_{n+1}$, ... of the double-frequency converting section 3b are alternately delivered every generation of a horizontal synchronization signal (FIG. 3(c)), thus in non-interlaced video signal form.

The operation of the vertical filter 10 which is a part of each scanning line converting section 4a, 4b will next be described for the following two cases: the full-screen mode and the left-and-right-side cut mode.

The operation of the full-screen mode will first be described with reference to FIG. 4. This is a mode in which a MUSE signal is converted to an NTSC signal by reducing the number of scanning lines of the MUSE signal by about one-third. When converting the first field of the MUSE signal, the movable contact of the switching circuit 15 in the vertical filter 10 of the scanning line converting section 4a is set to b, while the movable contact in the scanning line converting section 4b is set to a.

Upon input of scanning lines $Al_1, Al_2, \ldots$ in this sequence, these scanning lines are sequentially delayed at the line memories 11, 12, whereby upon arrival of a scanning line $Al_3$ in the input, the scanning line $Al_1$ has come to the line memory 12 and the scanning line $Al_2$ to the line memory 11. The vertical filter 10 of the scanning line converting section 4a calculates the weighted sum of these three scanning lines $Al_1$ to $Al_3$ to generate a new scanning line $AU_1$. The new scanning line $AU_1$ thus generated can be expressed as follows.

$$AU_1 = \frac{3}{8} Al_1 + \frac{4}{8} Al_2 + \frac{1}{8} Al_3 \quad (1)$$

Then, upon arrival of $Al_4$, the scanning line $Al_2$ has come to the line memory 12 and the scanning line $Al_3$ to the line memory 11. The vertical filter 10 of the scanning line converting section 4b calculates the weighted sum of these three scanning lines $Al_2$ to $Al_4$ to generate a new scanning line $AD_1$. This scanning line $AD_1$ can be expressed as follows.

$$AD_1 = \frac{1}{8} Al_2 + \frac{4}{8} Al_3 + \frac{3}{8} Al_4 \quad (2)$$

In this way, the scanning lines $AU_1, AU_2, \ldots$ are sequentially generated from the scanning lines $Al_1$ to $Al_3$, $Al_4$ to $Al_6$, ... at the vertical filter 10 of the scanning line converting section 4a, while the scanning lines $AD_1, AD_2, \ldots$ are sequentially generated from the scanning lines $Al_2$ to $Al_4$, $Al_5$ to $Al_7$, ... at the vertical filter 10 of the scanning line converting section 4b.

The scanning lines $AU_1, AU_2, \ldots$ and the scanning lines $AD_1, AD_2, \ldots$ thus generated get their horizontal scanning frequency double-converted at the double-frequency converting sections 3a, 3b, respectively, and are then synthesized in the output stage thereof to be converted to the non-interlaced video signals of the first field.

A MUSE signal for the second field is similarly processed. Namely, the scanning lines $BU_1, BU_2, \ldots$ are sequentially generated from the scanning lines $Bl_1$ to $Bl_3$, $Bl_4$, to $Bl_6$, ... at the vertical filter 10 of the scanning line converting section 4a, while the scanning lines $BD_1, BD_2, \ldots$ are sequentially generated from the scanning lines $Bl_2$ to $Bl_4$, $Bl_5$ to $Bl_7$, ... at the vertical filter 10 of the scanning line converting section 4b. In this case, the movable contact of the switching circuit 15 in the vertical filter 10 of the scanning line converting section 4a is set to a and the movable contact in the scanning line converting section 4b is set to b so that the weighted sum of the second field signals can be balanced with that of the first field signals. The scanning lines $BU_1$ and $BD_1$ thus generated can be expressed as follows.

$$BU_1 = \frac{1}{8} Bl_1 + \frac{4}{8} Bl_2 + \frac{3}{8} Bl_3 \quad (3)$$

$$BD_1 = \frac{3}{8} Bl_2 + \frac{4}{8} Bl_3 + \frac{1}{8} Bl_4 \quad (4)$$

The scanning lines $BU_1, BU_2, \ldots$ and the scanning lines $BD_1, BD_2, \ldots$ thus generated get their horizontal scanning frequency double-converted at the double-converting sections 3a, 3b, respectively, and are then synthesized on the output stage thereof to be converted to the non-interlaced video signals of the second field.

As described above, in the full-screen mode, the non-interlaced video signals are produced by sequentially generating an NTSC signal for one scanning line from three scanning lines of a MUSE signal, and alternately delivering the generated NTSC signals per scanning line at each of the two down-converters.

Figure 5A:
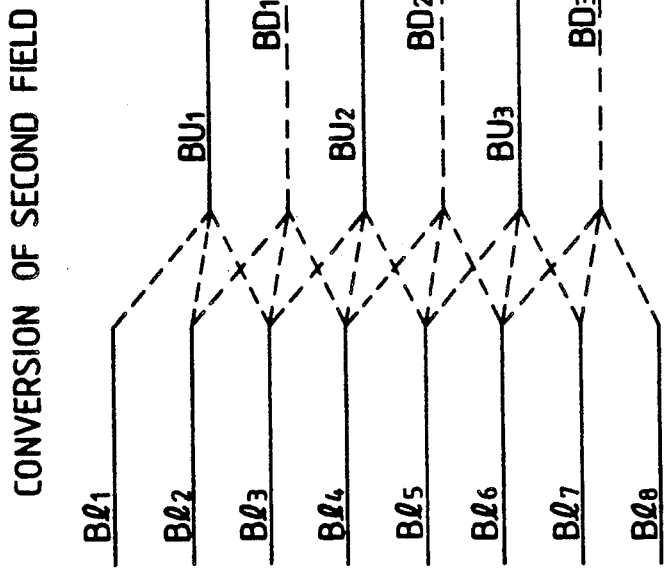
Figure 5B:
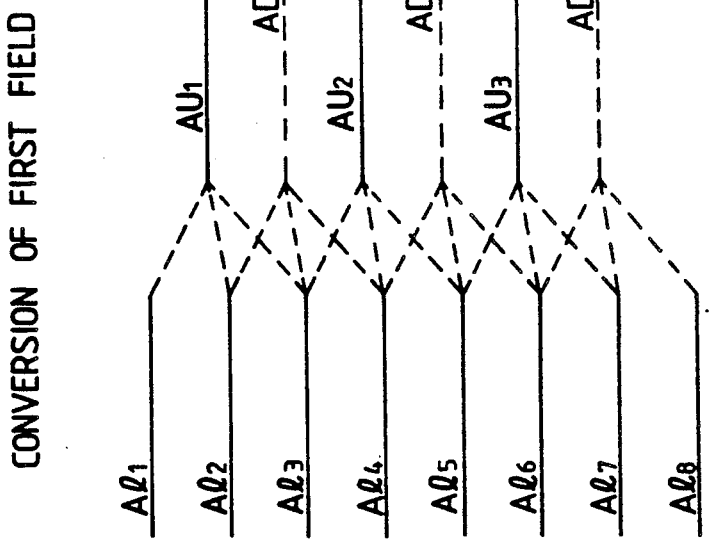
Figure 6A:
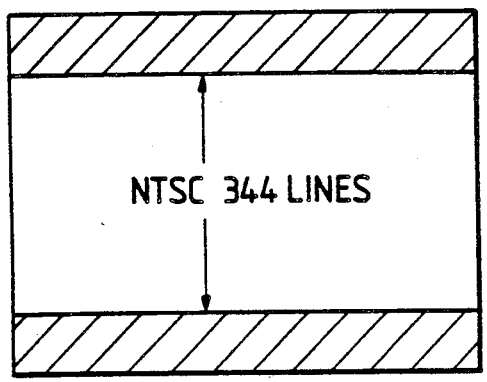
FIGS. 6a and 6b are diagrams showing examples of images in the output of a down-converter.
Figure 6B:
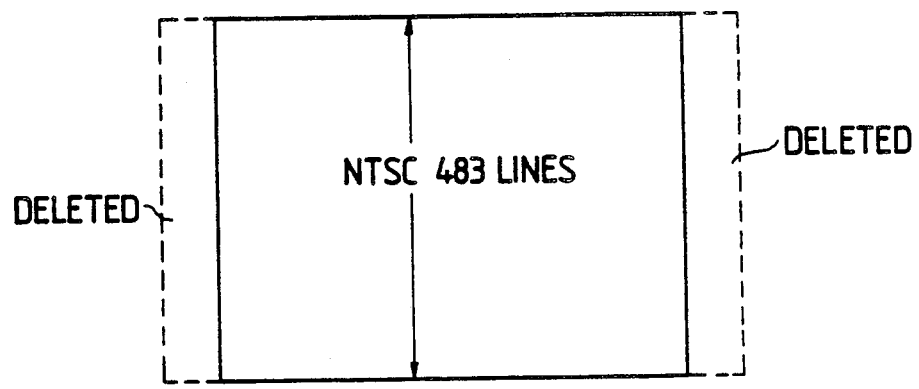

Now, the operation of the left-and-right-side cut mode will be described with reference to FIG. 5. This is a mode in which a MUSE signal is converted to an NTSC signal by reducing the number of its scanning lines by half. When converting a first field signal, both movable contacts of the switching circuits 15 in the vertical filters 10 of the scanning line converting sections 4a, 4b are set to a, while when converting a second field signal, both movable contacts of the scanning line converting sections 4a, 4b are set to b.

When converting a first field signal, the scanning lines $AU_1, AU_2, AU_3, \ldots$ are sequentially generated from the scanning lines $Al_1$ to $Al_3$, $Al_3$ to $Al_5$, $Al_5$ to $Al_7$, ... of the MUSE signal at the vertical filter 10 of the scanning line converting section 4a, while the scanning lines $AD_1, AD_2, AD_3, \ldots$ are sequentially generated from the scanning lines $Al_2$ to $Al_4$, $Al_4$ to $Al_6$, $Al_6$ to $Al_8$, ... of the MUSE signal at the vertical filter 10 of the scanning line converting section 4b. The weighted sums of the newly generated scanning lines $AU_m$ and $AD_m$ are the same and are commonly expressed as follows.

$$AU_m = AD_m = \frac{3}{8} Al_n + \frac{4}{8} Al_{n+1} + \frac{1}{8} Al_{n+2} \quad (5)$$

Also, when converting a second field signal, the scanning lines $BU_1, BU_2, BU_3, \ldots$ are sequentially generated from the scanning lines $Bl_1$ to $Bl_3$, $Bl_3$ to $Bl_5$, $Bl_5$ to $Bl_7$, ... of the MUSE signal by the vertical filter 10 of the scanning line converting section 4a, while scanning lines $BD_1, BD_2, BD_3 \ldots$ are sequentially generated from the scanning lines $Bl_2$ to $Bl_4$, $Bl_4$ to $Bl_6$, $Bl_6$ to $Bl_8$, ... of the MUSE signal by the vertical filter 10 of the scanning line converting section 4b. The weighted sums of the newly generated scanning lines $BU_m$ and $BD_m$ are the same and are commonly expressed as follows.

$$BU_m = BD_m = \frac{1}{8} Bl_n + \frac{4}{8} Bl_{n+1} + \frac{3}{8} Bl_{n+2} \quad (6)$$

The generated scanning lines are processed by the double-frequency converting sections 3a, 3b, respectively, in the same manner as in the full-screen mode.

Accordingly, in the left-and-right-side cut mode, the NTSC signal for one scanning line is generated from the two scanning lines of the MUSE signal at each of the two down-converters, and the non-interlaced video signals are produced by alternately delivering the thus generated NTSC signals per scanning line.

In such embodiments, the changing of the movable contact of the switching circuit is performed at every field. A field changing is detected by the vertical synchronize signal or the counting of the scanning lines.

Thus, according to the present invention, an interlaced high definition television signal is converted to the current television signal at two down-converts, respectively, and the down-converted television signals are further frequency-converted to a frequency double the original high definition television frequency. Then, the frequency-converted signals are synthesized to obtain the non-interlaced video signal.

Furthermore, the switching circuit of the vertical filter, which is a part of the down-converter, can be switched depending on the down-converter to which the vertical filter in operation belongs, the field and output image mode to which the scanning line to be converted belongs, and like conditions, whereby it is possible to obtain a non-interlaced video signal with no additional interlaced/non-interlace converting means.

What is claimed is:

1. A scanning line converting system comprising:
    a plurality of down-converters, arranged in parallel, for converting a high definition television signal having a first horizontal line frequency to current television signals having significantly lower horizontal line frequencies; and
    a plurality of double-frequency converting means for respectively doubling frequencies of said converted signals so as to generate a non-interlaced video signal.

2. A scanning line converting system according to claim 1, wherein said plurality of down-converters respectively comprise:
    scanning line converting means for reducing a number of scanning lines of said input high definition television signal and for converting said reduced high definition television signal to said current television signals; and
    output means for adding horizontal and vertical synchronization signals to said current television signals.

3. A scanning line converting system according to claims 2, wherein each of said scanning line converting means comprises vertical filter means for generating a current television signal for one scanning line from a plurality of adjacent scanning lines of said high definition television signal.

4. A scanning line converting system according to claim 3, wherein each of said vertical filter means comprise:
    first and second line memories for sequentially delaying a scanning line signal;
    switching means for selecting a scanning line signal from one of an input scanning line signal of said first line memory and an output scanning line signal of said second line memory; and,
    arithmetic operation means for generating one scanning line signal from a weighted sum of said scanning line signals respectively delivered from said line memories and said scanning line signal selected by said switching means, wherein said switching means is selectively switched according to a line to which said vertical filter in operation belongs, and a field and an output image mode to which said scanning line signal to be converted belongs.

5. A scanning line converting system according to claim 4, wherein said high definition television signal is a MUSE signal, and said current television signal is an NTSC signal.

6. A scanning line converting system according to claim 1, further comprising input means for converting said high definition television signal to a digital signal before said plurality of down-converters performs converting.

7. A scanning line converting system according to claim 3, wherein said plurality of adjacent scanning lines of said high definition television signal comprises three adjacent scanning lines.

8. A scanning line converting system according to claim 3, wherein said plurality of adjacent scanning lines of said high definition television signal comprises two adjacent scanning lines.

9. A scanning line converting system according to claim 1, wherein said plurality of double-frequency converting means generates said non-interlaced video signal by alternately delivering said frequency-doubled converted signals each time a horizontal synchronization signal is generated.

* * * * *